(12) United States Patent
Tang

(10) Patent No.: US 11,140,735 B2
(45) Date of Patent: Oct. 5, 2021

(54) DATA REPLICATION CONTROLLING METHOD AND RELATED DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 16 days.

(21) Appl. No.: 16/738,925

(22) Filed: Jan. 9, 2020

(65) Prior Publication Data

US 2020/0146085 A1 May 7, 2020

Related U.S. Application Data

(63) Continuation of application No. PCT/CN2017/112309, filed on Nov. 22, 2017.

(30) Foreign Application Priority Data

Nov. 13, 2017 (WO) ................ PCT/CN2017/110704

(51) Int. Cl.
*H04W 56/00* (2009.01)
*H04W 76/15* (2018.01)
(Continued)

(52) U.S. Cl.
CPC ............ *H04W 76/15* (2018.02); *H04L 45/16* (2013.01); *H04W 80/02* (2013.01)

(58) Field of Classification Search
CPC ........ H04W 76/15; H04W 80/02; H04L 45/16
(Continued)

(56) References Cited

U.S. PATENT DOCUMENTS

2012/0057560 A1    3/2012    Park et al.
2015/0092707 A1*   4/2015    Kwon .................. H04L 5/0098
                                                           370/329
(Continued)

FOREIGN PATENT DOCUMENTS

CN        101060524 A       10/2007
CN        103916455 A       7/2014
(Continued)

OTHER PUBLICATIONS

The first OA and search report of the parallel CN application dated Dec. 13, 2019.
(Continued)

*Primary Examiner* — Sai Ming Chan
(74) *Attorney, Agent, or Firm* — Ladas & Parry, LLP

(57) ABSTRACT

Embodiments of the present application provide a data replication controlling method and a related device, the method includes: receiving, by a user equipment, a first MAC CE sent by a first network device, and receiving a second MAC CE sent by a second network device; and activating or deactivating, by the user equipment, data replication based on the first MAC CE and the second MAC CE. The embodiments of the present application may be adopted to enable the user equipment to clarify whether the data replication is activated or deactivated.

16 Claims, 8 Drawing Sheets

(51) Int. Cl.
*H04L 12/761* (2013.01)
*H04W 80/02* (2009.01)

(58) Field of Classification Search
USPC .......................................... 370/310
See application file for complete search history.

(56) References Cited

U.S. PATENT DOCUMENTS

| | | | |
|---|---|---|---|
| 2015/0215929 | A1 | 7/2015 | Damnjanovic et al. |
| 2019/0379519 | A1* | 12/2019 | Shi ..................... H04W 72/04 |

FOREIGN PATENT DOCUMENTS

| | | |
|---|---|---|
| CN | 104205993 A | 12/2014 |
| CN | 104349466 A | 2/2015 |
| CN | 104936222 A | 9/2015 |
| CN | 105338611 A | 2/2016 |
| CN | 105453687 A | 3/2016 |
| CN | 105637967 A | 6/2016 |
| CN | 105850189 A | 8/2016 |
| CN | 106688296 A | 5/2017 |
| CN | 107006051 A | 8/2017 |
| CN | 107147479 A | 9/2017 |
| WO | 2016047904 A1 | 3/2016 |
| WO | 2017124327 A1 | 7/2017 |
| WO | 2019090829 A1 | 11/2017 |

OTHER PUBLICATIONS

R2-1706372; 3GPP TSG-RAN WG2 Meeting#NR AH2, CATT Impact of PDCP duplication on MAC; Jun. 16, 2017.
R2-1709095; 3GPP TSG-RAN WG2#99; LG Electronics Inc. Need for Duplicate RB; Aug. 11, 2017.
The EESR of corresponding European application No. 17931093.3, dated Sep. 2, 2020.
CATT 等 R2-1710309 Dynamic leg switching for splitduplication bearer 3GPP TSG-RAN WG2 #99bis 13.10月2017.
CATT R2-1707921 Duplication ActivationDeactivation MAC CE 3GPP TSG-RAN WG2 #99 25.8月 2017.
International Search Report in the international application No. PCT/CN2017/112305, dated Jul. 4, 2018.
International Search Report in the international application No. PCT/CN2018/072109, dated Apr. 28, 2018.
The Second Office Action of corresponding Chinese application No. 201880003316.2, dated Mar. 9, 2020.
International Search Report (ISR) dated Aug. 3, 2018 for Application No. PCT/CN2017/112309.

* cited by examiner

# DATA REPLICATION CONTROLLING METHOD AND RELATED DEVICE

CROSS-REFERENCE TO RELATED APPLICATION

This application is a continuation of International Application No. PCT/CN2017/112309, filed on Nov. 22, 2017, which claims priority to PCT patent application PCT/CN2017/110704, filed on Nov. 13, 2017, which are hereby incorporated by reference in their entireties.

TECHNICAL FIELD

The present application relates to the field of communication technology, and in particular, to a data replication controlling method and related device.

BACKGROUND

In dual connectivity (DC), a replication data transmission mode uses a split bearer protocol architecture, and for uplink and downlink, a Packet Data Convergence Protocol (PDCP) layer is located in a Cell Group (CG), such as a Master Cell Group (MCG) or a Secondary Cell Group (SCG), and a CG where the PDCP located is an anchor CG. The PDCP layer of the sending end device replicates a PDCP Protocol Data Unit (PDU) into two identical PDUs, such as one is PDCP PDU and one is Duplicated PDCP PDU, and the two PDCP PDUs pass through radio link control (RLC) layers and Media Access Control (MAC) layers of different CGs, then reach corresponding MAC and RLC layers of a receiving end device after passing through an air interface, and finally converge to a PDCP layer of the receiving end device. In the case that the PDCP layer of the receiving end device detects that the two PDCP PDUs are identical PDUs, the PDCP layer of the receiving end device discards one of the PDUs and delivers another PDU to a high layer.

SUMMARY

Embodiments of the present application provide a data replication controlling method and a related device, which is used for a user equipment to clarify whether data replication is activated or deactivated.

In a first aspect, an embodiment of the present application provides a data replication controlling method, including:
 receiving, by a user equipment, a first MAC CE sent by a first network device, and receiving a second MAC CE sent by a second network device; and
 activating or deactivating, by the user equipment, data replication based on the first MAC CE and the second MAC CE.

In a second aspect, an embodiments of the present application provides a data replication controlling method, including:
 sending, by a first network device, default path configuration information to a second network device and a user equipment; and
 sending, by the first network device, a first MAC CE to the user equipment, where the MAC CE is configured to activate or deactivate data replication.

In a third aspect, an embodiment of the present application provides a data replication controlling method, including:
 receiving, by a second network device, default path configuration information sent by a first network device; and
 sending, by the second network device, a second MAC CE to a user equipment, where the second MAC CE is configured to activate or deactivate data replication.

In a fourth aspect, an embodiment of the present application provides a user equipment, including a processing unit and a communication unit, where:
 the processing unit is configured to receive, through the communication unit, a first MAC CE sent by a first network device, and receive a second MAC CE sent by a second network device; and
 the processing unit is further configured to activate or deactivate data replication based on the first MAC CE and the second MAC CE.

In a fifth aspect, an embodiment of the present application provides a network device, applied to a communications system including a first network device, a second network device, and a user equipment, where the network device is the first network device, and the first network device includes a processing unit and a communication unit, and where:
 the processing unit is configured to send default path configuration information to the second network device and the user equipment through the communication unit; and
 the processing unit is further configured to send, through the communication unit, a first MAC CE to the user equipment, where the MAC CE is configured to activate or deactivate data replication.

In a sixth aspect, an embodiment of the present application provides a network device, applied to a communications system including a first network device, a second network device and a user equipment, where the network device is the second network device, and the second network device includes a processing unit and a communication unit, and where:
 the processing unit is configured to receive, through the communication unit, default path configuration information sent by the first network device; and
 the processing unit is configured to send, through the communication unit, a second MAC CE to the user equipment, where the second MAC CE is configured to activate or deactivate data replication.

In a seventh aspect, an embodiment of the present application provides a network device including one or more processors, one or more memories, one or more transceivers and one or more programs, where the one or more programs is stored in the memory, and is configured to be executed by the one or more processors, and the program includes instructions for performing the steps in the method according to the first aspect.

In an eighth aspect, an embodiment of the present application provides a user equipment including one or more processors, one or more memories, one or more transceivers and one or more programs, where the one or more programs is stored in the memory, and is configured to be executed by the one or more processors, and the program includes instructions for performing the steps in the method according to the second aspect.

In a ninth aspect, an embodiment of the present application provides a network device including one or more processors, one or more memories, one or more transceivers and one or more programs, where the one or more programs is stored in the memory, and is configured to be executed by the one or more processors, and the program includes instructions for performing the steps in the method according to the third aspect.

In a tenth aspect, an embodiment of the present application provides a computer readable storage medium storing a computer program for electronic data exchange, where the computer program causes a computer to execute part or all of the steps described in the method according to the first aspect.

In an eleventh aspect, an embodiment of the present application provides a computer readable storage medium storing a computer program for electronic data exchange, where the computer program causes a computer to execute part or all of the steps described in the method according to the second aspect.

In a twelfth aspect, an embodiment of the present application provides a computer readable storage medium storing a computer program for electronic data exchange, where the computer program causes a computer to execute part or all of the steps described in the method according to the third aspect.

In a thirteenth aspect, an embodiment of the present application provides a computer program product, where the computer program product includes a non-transitory computer readable storage medium storing a computer program, the computer program is operated to cause a computer to execute part or all of the steps described in the method according to the first aspect. The computer program product may be a software installation package.

In a fourteenth aspect, an embodiment of the present application provides a computer program product, where the computer program product includes a non-transitory computer readable storage medium storing a computer program, the computer program is operated to cause a computer to execute part or all of the steps described in the method according to the second aspect. The computer program product may be a software installation package.

In a fifteenth aspect, an embodiment of the present application provides a computer program product, where the computer program product includes a non-transitory computer readable storage medium storing a computer program, the computer program is operated to cause a computer to execute part or all of the steps described in the method according to the third aspect. The computer program product may be a software installation package.

These and other aspects of the present application will be more clear and easy to understand in the following description of the embodiments.

BRIEF DESCRIPTION OF DRAWINGS

In order to illustrate the technical solutions in the embodiments of the present application or in the background more clearly, the appended drawings to be used in the embodiments of the present application or in the background will be described below.

DESCRIPTION OF EMBODIMENTS

The terms used in the implementations of the present application are merely used to explain the specific embodiments of the present application, and are not intended to limit the present application.

The terms "first", "second", "third", and "fourth" and the like in the specification and claims of the present application and the appended drawings are used to distinguish different objects, and are not used to describe a specific order. Furthermore, the terms "include" and "have" and any variants thereof are intended to cover a non-exclusive inclusion.

Figure 1A:
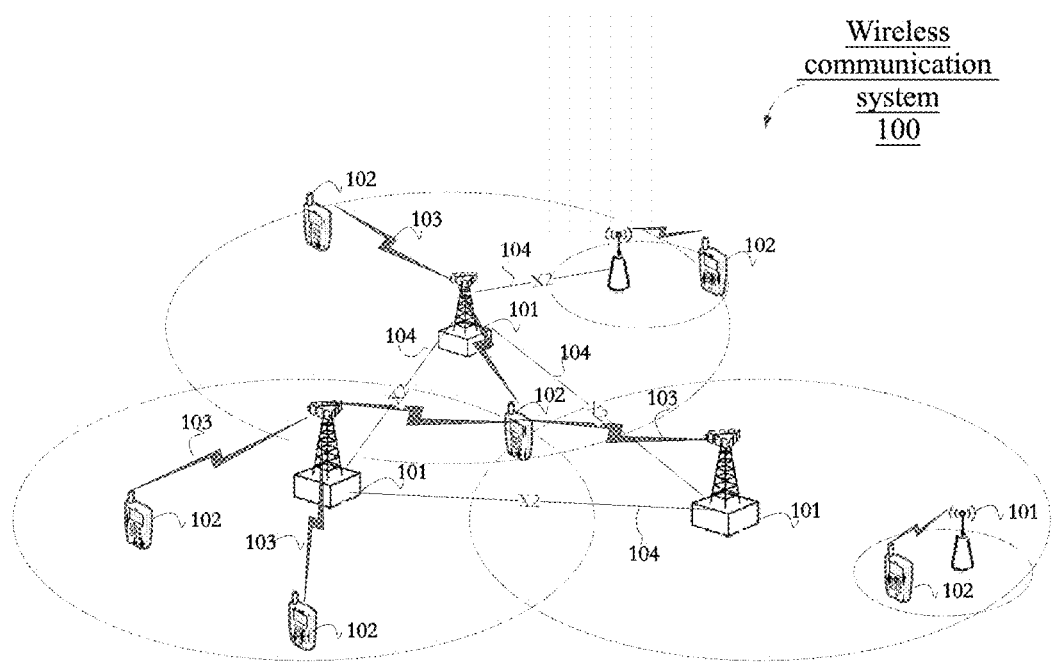
FIG. 1A is a schematic diagram of an architecture of a wireless communication system involved in the present application.

FIG. 1A shows a wireless communication system involved in the present application. The wireless communication system is not limited to a Long Term Evolution (LTE) system, and may be a further evolved 5th Generation (5G) mobile communication system, a new radio (NR) system, a machine to machine communication (M2M) system, and the like. As shown in FIG. 1A, a wireless communication system 100 may include one or more network devices 101 and one or more user equipment 102.

The network device 101 may be a base station, and the base station may be configured to communicate with one or more user equipment, or may be configured to communicate with one or more base stations partially having user equipment functions (for example, a communication between a macro base station and a micro base station, such as an access point). The base station may be a Base Transceiver Station (BTS) in a Time Division Synchronous Code Division Multiple Access (TD-SCDMA) system, or may be an Evolutional Node B (eNB) in an LTE system, and a base station in 5G system, new radio (NR) system. In addition, the base station may also be an Access Point (AP), a Trans TRP, a Central Unit (CU), or other network entities, and may include some or all of the functions of the above network entities.

The user equipment 102 may be distributed throughout the wireless communication system 100, either stationary or mobile. In some embodiments of the present application, the terminal 102 may be a mobile device, a mobile station, a mobile unit, an M2M terminal, a wireless unit, a remote unit, a user agent, a mobile client, and the like.

In particular, the network device 101 may be configured to communicate with the user equipment 102 via a wireless interface 103 under the control of a network device controller (not shown). In some embodiments, the network device controller may be part of a core network or may be integrated into the network device 101. The network device 101 and the network device 101 may also communicate with each other directly or indirectly via a backhaul interface 104 (such as an X2 interface).

Figure 1B:
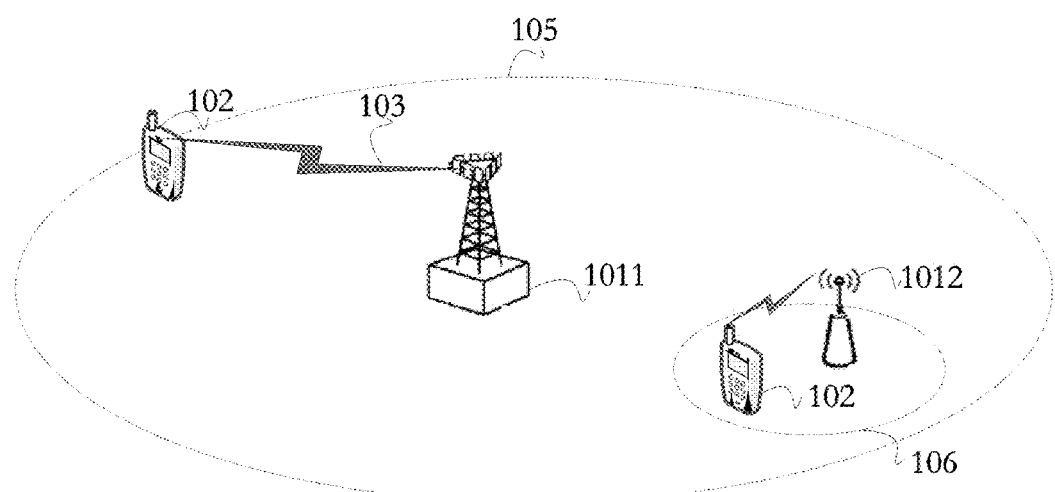
FIG. 1B is a schematic diagram of a network architecture with a dual connectivity involved in the present application.

FIG. 1B shows a schematic diagram of a network architecture with a dual connectivity. As shown in FIG. 1B, a network device 1011 provides a basic network coverage 105. A network device 1012 provides a relatively small network coverage 106. A User Equipment (UE) 102 in a common coverage of the network device 1011 and the network device 1012 will be able to establish communication connections with the network device 1011 and the network device 1012 simultaneously. Here, the case where one user equipment 102 is simultaneously connected to one network device 1011 and the network device 1012 is referred to as a dual connectivity. As shown in FIG. 1B, under the dual connectivity, the network device 1011 is a master node (MN), and the network device 1012 is a slave node (SN).

Figure 1C:
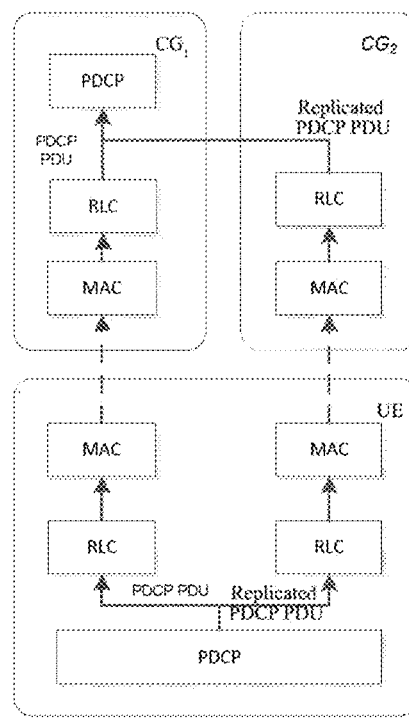
FIG. 1C is a schematic diagram of an uplink data replication transmission under DC involved in the present application.

FIG. 1C shows a schematic diagram of an uplink data replication transmission under DC. As shown in FIG. 1C, a User Equipment (UE) includes at least one PDCP entity, two RLC entities, and two MAC entities. Under the data replication, the PDCP entity of the user equipment performs the data replication to obtain a PDCP PDU and a replicated PDCP PDU, and then the PDCP entity of the user equipment respectively delivers the PDCP PDU and the replicated PDCP PDU to the two RLC entities of user equipment, and the two RLC entities of the user equipment respectively delivers to two MAC entities of the user equipment, the two MAC entities of the user equipment transmit the two data to two network devices via wireless interfaces, and the two data are finally aggregated in a PDCP entity of one of the network devices.

Figure 1D:
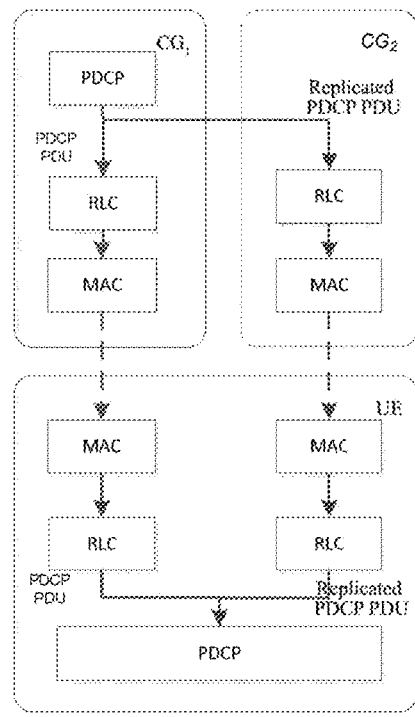
FIG. 1D is a schematic diagram of a downlink data replication transmission under DC involved in the present application.

FIG. 1D shows a schematic diagram of downlink data replication transmission under DC. As shown in FIG. 1D, a network device in cell group 1 (CG1) at least includes one PDCP entity, one RLC entity, and one MAC entity, and the network device in CG2 at least includes one RLC entity and one MAC entity. Under data replication, the PDCP entity of the network device at the CG1 performs data replication to obtain a PDCP PDU and a replicated PDCP PDU, and then the PDCP entity of the network device at the CG1 delivers the PDCP PDU and the replicated PDCP PDU to its own RLC entity and the RLC entity of the network device at the CG2, and the RLC entities of the two network devices respectively deliver the two data to their own MAC entities, and the MAC entities of the two network devices transmit the two data to a user equipment via wireless interfaces, and the two data are finally aggregated in a PDCP entity of the user equipment.

In a prior discussion of NR, for radio bearers configured with a replication data transmission function, a MAC control element (CE) may be configured to dynamically activate or deactivate the data replication transmission function of a certain bearer. In a DC scenario, since both a master node (MN) and a slave node (SN) may send MAC CE to activate or deactivate the replication data function of a certain split bearer of a user equipment, then in this case, in order to prevent two network nodes from sending the MAC CE to control the data replication transmission function of the user equipment, the user equipment needs to know how to control its own data replication transmission function based on the MAC CEs sent by the two network devices.

In the present application, first, under a DC, a MAC CE-related data replication control rule is configured in advance, and the data replication control rule may be configured by a protocol or by a network device. If the data replication control rule is configured by the protocol, both two network devices and a user equipment know; or the two network devices do not know, but the user equipment knows; or one network device knows and another network device does not know, but the user equipment needs to know. If the data replication control rule is configured by one of the network devices, the network device performing the configuration may send the data replication control rule to another network device and the user equipment; or merely to the user equipment.

Then, the user equipment receives a first MAC CE sent by a first network device and a second MAC CE sent by a second network device. Based on the above data replication control rule, the user equipment may clarify whether the data replication is activated or deactivated.

There are two kinds of data replication control rules, the first kind includes the following several situations:

in a case where the first MAC CE activates the data replication and the second MAC CE activates the data replication, the user equipment activates the data replication;

in a case where the first MAC CE deactivates the data replication and the second MAC CE activates the data replication, the user equipment deactivates the data replication;

in a case where the first MAC CE activates the data replication and the second MAC CE deactivates the data replication, the user equipment deactivates the data replication; and in a case where the first MAC CE deactivates the data replication and the second MAC CE deactivates the data replication, the user equipment deactivates the data replication.

The second kind includes the following several situations:

in a case where the first MAC CE activates the data replication and the second MAC CE activates the data replication, the user equipment activates the data replication;

in a case where the first MAC CE deactivates the data replication and the second MAC CE activates the data replication, the user equipment activates the data replication;

in a case where the first MAC CE activates the data replication and the second MAC CE deactivates the data replication, the user equipment activates the data replication; and in a case where the first MAC CE deactivates the data replication and the second MAC CE deactivates the data replication, the user equipment deactivates the data replication.

The first MAC CE is sent by the first network device, and the second MAC CE is sent by the second network device.

It can be seen that, in a case where the MAC CEs sent by the two network devices are received, the user equipment may clarify whether the data replication is activated or deactivated based on the MAC CE-related data replication control rule configured in advance.

It should be noted that the wireless communication system 100 shown in FIG. 1A is merely for the purpose of explaining the technical solutions of the present application more clearly, and does not constitute a limitation of the present application, and those ordinary skilled in the art may know that with an evolution of the network structure and an appearance of new service scenario, the technical solutions provided in the present application are also applicable to similar technical problems.

Figure 2:
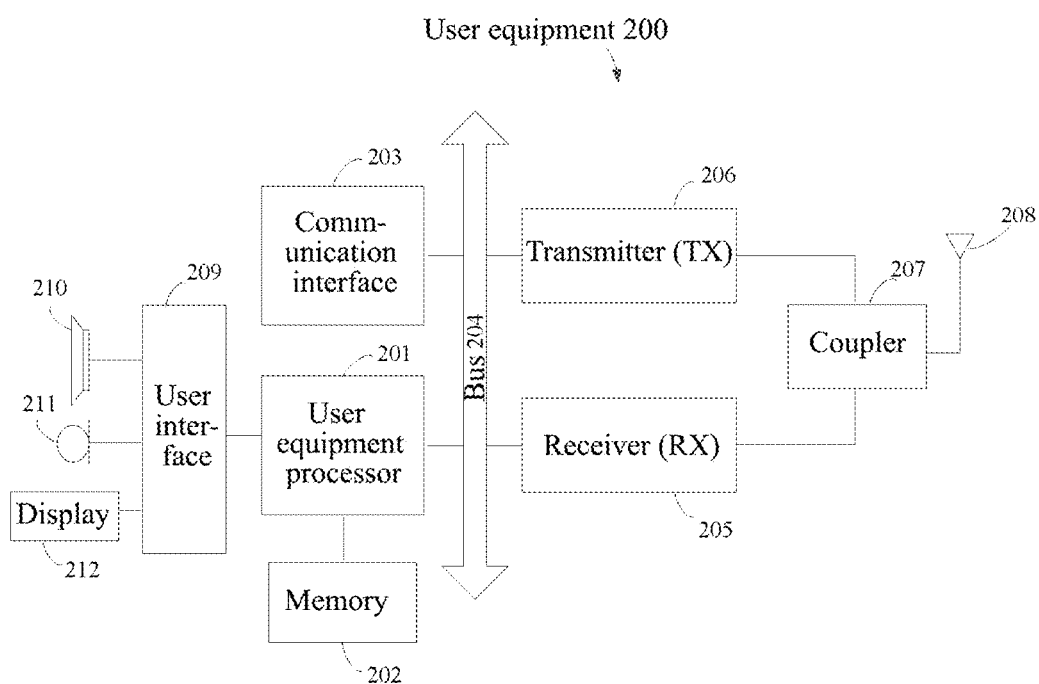
FIG. 2 is a schematic structural diagram of a user equipment provided in an embodiment of the present application.

Referring to FIG. 2, FIG. 2 shows a user equipment 200 provided in some embodiments of the present application.

As shown in FIG. 2, the user equipment 200 may include: one or more user equipment processors 201, a memory 202, a communication interface 203, a receiver 205, a transmitter 206, a coupler 207, an antenna 208, a user interface 202, and an input and output module (including an audio input and output module 210, a key input module 211, a display 212, and the like). These components may be connected through a bus 204 or other means, and FIG. 2 is exemplified by a bus.

The communication interface 203 may be used for user equipment 200 to communicate with other communication devices, such as a network device. Specifically, the network device may be a network device 300 shown in FIG. 3. Specifically, the communication interface 203 may be a Long Term Evolution (LTE) (4G) communication interface, or may be a communication interface of a 5G or a future new air interface. Not limited to a wireless communication interface, the user equipment 200 may also be configured with a wired communication interface 203, such as a Local Access Network (LAN) interface.

The transmitter 206 may be configured to perform a transmission processing, such as a signal modulation, on a signal output by the user equipment processor 201. The receiver 205 may be configured to perform a receiving processing, such as a signal demodulation, on a mobile communication signal received by the antenna 208. In some embodiments of the present application, the transmitter 206 and the receiver 205 may be viewed as a wireless modem. In the user equipment 200, the number of the transmitter 206 and the receiver 205 may each be one or more. The antenna 208 may be configured to convert an electromagnetic energy in a transmission line into an electromagnetic wave in a free space, or convert the electromagnetic wave in the free space into the electromagnetic energy in the transmission line. The coupler 207 is configured to divide the mobile communication signal received by antenna 308 into multiple paths and distribute them to multiple receivers 205.

In addition to the transmitter 206 and the receiver 205 shown in FIG. 2, the user equipment 200 may also include other communication components, such as a GPS module, a Bluetooth module, a Wireless Fidelity (Wi-Fi) module, and the like. Without being limited to the wireless communication signals described above, the user equipment 200 may also support other wireless communication signals, such as a satellite signal, a short wave signal, and the like. Not limited to wireless communication, the user equipment 200 may also be configured with a wired network interface (such as a LAN interface) to support wired communication.

The input and output module may be configured to implement interaction between the user equipment 200 and the user/external environment, and may mainly include the audio input and output module 210, the key input module 211, the display 212, and the like. Specifically, the input and output module may further include: a camera, a touch screen, a sensor, and the like. The input and output module communicates with the user equipment processor 201 through the user interface 209.

The memory 202 is coupled to the terminal processor 201 for storing various software programs and/or multiple sets of instructions. Specifically, the memory 202 may include a high speed random access memory, and may also include a non-volatile memory, such as one or more magnetic disk storage devices, flash memory devices, or other non-volatile solid state storage devices. The memory 202 may store an operating system (hereinafter referred to as a system for short), for example, an embedded operating system such as ANDROID, IOS, WINDOWS, or LINUX. The memory 202 may also store a network communication program that may be configured to communicate with one or more additional devices, one or more user equipment and one or more network devices. The memory 202 may also store a user interface program which may realistically display a content of an application through a graphical operation interface, and receive a control operation of the user on the application through an input control such as a menu, a dialog box and a key, and the like.

In some embodiments of the present application, the memory 202 may be configured to store implementation programs of the data replication controlling method provided by one or more embodiments of the present application on the user equipment 200 side. With regard to the implementation of the data replication controlling method provided in the one or more embodiments of the present application, reference may be made to the following embodiments of the method.

In some embodiments of the present application, the user equipment processor 201 may be configured to read and execute computer readable instructions. Specifically, the user equipment processor 201 may be configured to invoke a program stored in the memory 212, for example, the implementation programs of the data replication controlling method provided by the one or more embodiments of the present application on the user equipment 200 side, and execute instructions included in the program.

It may be understood that the user equipment 200 may be implemented as a mobile device, a mobile station, a mobile unit, a wireless unit, a remote unit, a user agent, a mobile client, and the like.

It should be noted that the user equipment 200 shown in FIG. 2 is merely one implementation of the embodiments of the present application, the user equipment 200 may further include more or fewer components in an actual application, which are not limited herein.

Figure 3:
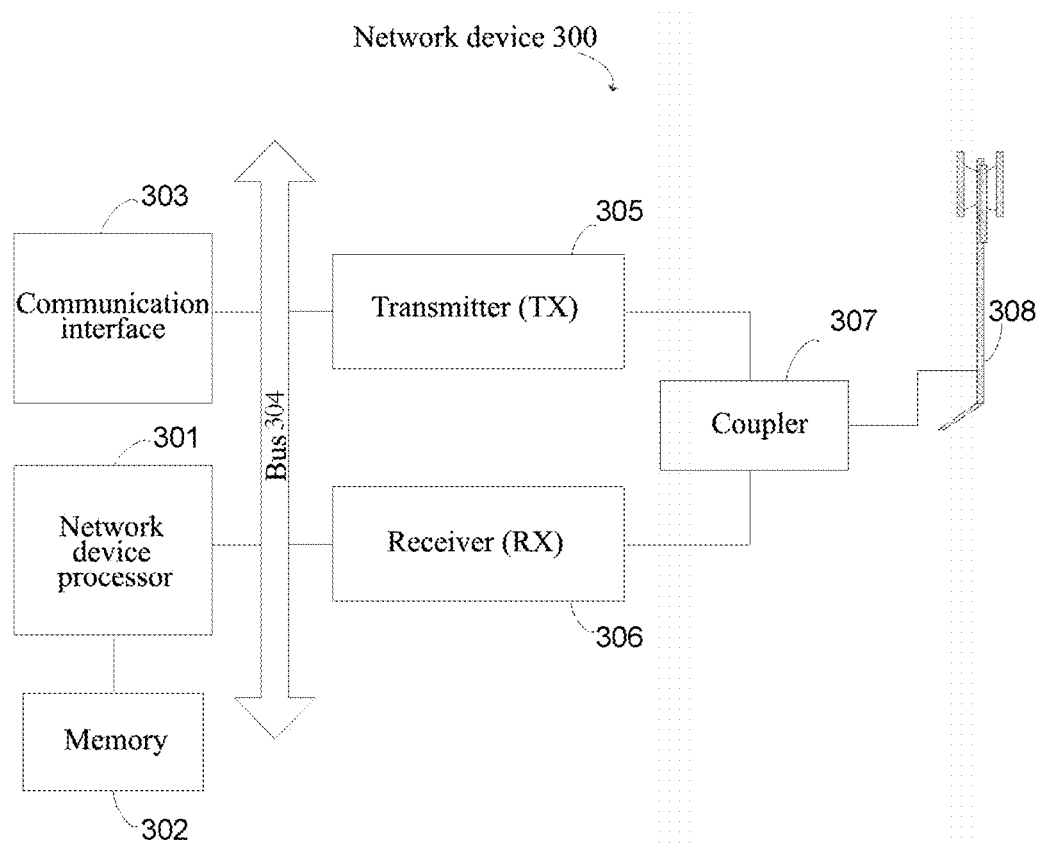
FIG. 3 is a schematic structural diagram of a network device provided in an embodiment of the present application.
Figure 4:
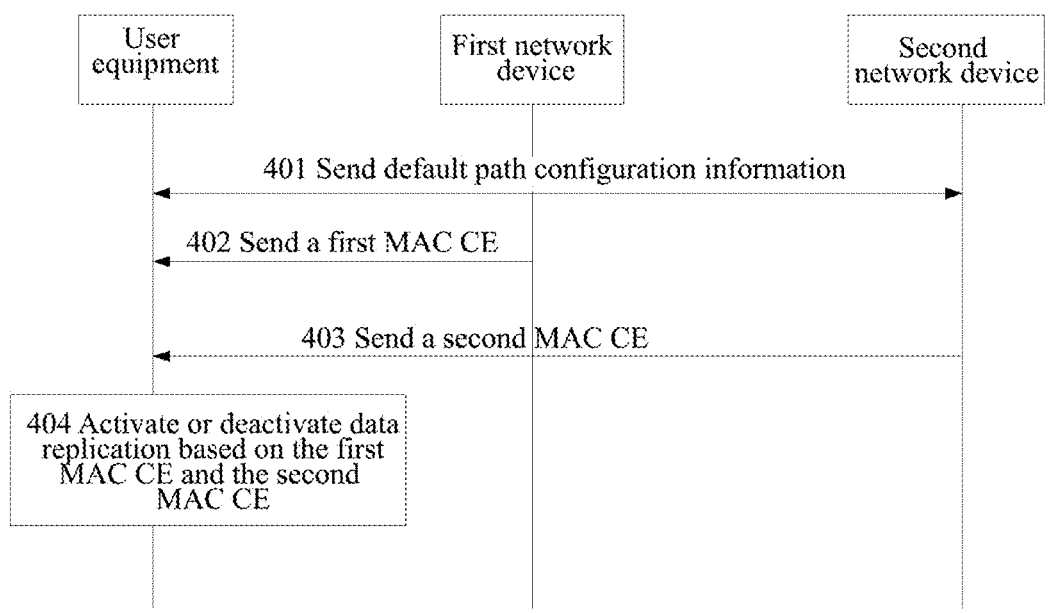
FIG. 4 is a schematic flowchart of a data replication controlling method provided in an embodiment of the present application.

Referring to FIG. 3, FIG. 3 shows a network device 300 provided in some embodiments of the present application. As shown in FIG. 3, the network device 300 may include one or more network device processors 301, a memory 302, a communication interface 303, a transmitter 305, a receiver 306, a coupler 307, and an antenna 308. These components may be connected through a bus 304 or other means, and FIG. 4 is exemplified by a bus connection.

The communication interface 303 may be used by network device 300 to communicate with other communication devices, such as a user equipment or other network devices. Specifically, the user equipment may be the user equipment 200 shown in FIG. 2. Specifically, the communication interface 303 may be a Long Term Evolution (LTE) (4G) communication interface, or may be a communication interface of a 5G or a future new air interface. Not limited to a wireless communication interface, the network device 300 may also be configured with a wired communication interface 303 to support wired communication. For example, a backhaul link between one network device 300 and other network devices 300 may be a wired communication connection.

The transmitter 305 may be configured to perform a transmission processing, such as a signal modulation, on a signal output by the network device processor 301. The receiver 306 may be configured to perform a receiving processing, such as a signal demodulation, on a mobile communication signal received by the antenna 308. In some embodiments of the present application, the transmitter 305 and the receiver 306 may be viewed as a wireless modem. In the network device 300, the number of the transmitter 305 and the receiver 306 may each be one or more. The antenna 308 may be configured to convert an electromagnetic energy in a transmission line into an electromagnetic wave in a free space, or convert the electromagnetic wave in the free space into the electromagnetic energy in the transmission line. The coupler 307 may be configured to divide the mobile communication signal into multiple paths and distribute them to multiple receivers 306.

The memory 302 is coupled to the network device processor 301 for storing various software programs and/or multiple sets of instructions. Specifically, the memory 302 may include a high speed random access memory, and may also include a non-volatile memory, such as one or more magnetic disk storage devices, flash memory devices, or other non-volatile solid state storage devices. The memory 302 may store an operating system (hereinafter referred to as a system for short), for example, an embedded operating system such as uCOS, VxWorks, or RTLinux. The memory 402 may also store a network communication program that may be configured to communicate with one or more additional devices, one or more terminal devices, and one or more network devices.

The network device processor 301 may be configured to perform a wireless channel management, implement call and communication link establishment and teardown, and provide cell handover control and the like for users in the present control area. Specifically, the network device processor 301 may include: an administration module/communication module (AM/CM) (used for a center for voice exchange and information exchange), and a basic module (BM) (used for completing call processing, signaling processing, radio resource management, radio link management and circuit maintenance function), a transcoder and submultiplexer (TCSM) (used for completing multiplexing and demultiplexing and code conversion function), and the like.

In some embodiments of the present application, the memory 302 may be configured to store implementation programs of the data replication controlling method provided by one or more embodiments of the present application on the network device 300 side. With regard to the implementation of the data replication controlling method provided in the one or more embodiments of the present application, reference may be made to the following the embodiments of the method.

In the embodiments of the present application, the network device processor 301 may be configured to read and execute computer readable instructions. Specifically, the network device processor 301 may be configured to invoke a program stored in the memory 302, for example, the implementation programs of the data replication controlling method provided by the one or more embodiments of the present application on the network device 300 side, and execute the instructions included in the program.

It may be understood that the network device 300 may be implemented as a base transceiver station, a wireless transceiver, a basic service set (BSS), an extended service set (ESS), a NodeB, an eNodeB, an access point or a TRP, and the like.

It should be noted that the network device 300 shown in FIG. 3 is merely one implementation of the embodiments of the present application, and the network device 300 may further include more or fewer components in actual applications, which are not limited herein.

Based on the foregoing embodiments respectively corresponding to the wireless communication system 100, the user equipment 200, and the network device 300, the embodiment of the present application provide a data replication controlling method.

Referring to FIG. 4A, FIG. 4A is a schematic flowchart of a data replication controlling method provided in an embodiment of the present application, which is applied to a communication system including a user equipment, a first network device and a second network device, and includes the following steps:

Step 401: a first network device sends default path configuration information to a second network device and a user equipment; a second network device receives the default path configuration information sent by the first network device; and the user equipment receives the default path configuration information sent by the first network device.

Step 402: the first network device sends a first MAC CE to the user equipment; the user equipment receives the first MAC CE sent by the first network device, where the first MAC CE is configured to activate or deactivate data replication.

Step 403: the second network device sends a second MAC CE to the user equipment; the user equipment receives the second MAC CE sent by the first network device, where the second MAC CE is configured to activate or deactivate the data replication.

Step 404: the user equipment activates or deactivates the data replication based on the first MAC CE and the second MAC CE.

The details will be described below based on the embodiment shown in FIG. 4.

Under DC, the first network device is a MN, and the second network device is a SN, or the first network device is the SN, and the second network device is the MN.

Under DC, a path includes a master cell group (MCG) path and a slave cell group (SCG) path, where the master cell group path is a path where the MN is located, and the slave cell group path is a path where the SN is located.

The default path configuration information is configured by the first network device. When the default path configuration information is about MCG path configuration information, it indicates that a default path is the MCG path, and when the default path configuration information is about SCG path configuration information, it indicates that the default path is the SCG path.

Based on the foregoing first data replication control rule, a specific implementation that the user equipment activates or deactivates the data replication based on the first MAC CE and the second MAC CE includes:

in a case where the first MAC CE activates the data replication and the second MAC CE activates the data replication, the user equipment activates the data replication; in a case where the first MAC CE deactivates the data replication and the second MAC CE activates the data replication, the user equipment deactivates the data replication; in a case where the first MAC CE activates the data replication, the second MAC CE deactivates the data replication, the user equipment deactivates the data replication; and in a case where the first MAC CE deactivates the data replication, and the second MAC CE deactivates the data replication In the case, the user equipment deactivates the data replication.

For example, it is assumed that the first MAC CE is Activation and the second MAC CE is Activation, the user equipment activates the data replication. It is further assumed that the first MAC CE is Deactivation and the second MAC CE is Activation, the user equipment deactivates the data replication. It is further assumed that the first MAC CE is Activation and the second MAC CE is Deactivation, the user equipment deactivates the data replication. It is further assumed that the first MAC CE is Deactivation and the second MAC CE is Deactivation, the user equipment deactivates the data replication.

Based on the foregoing second data replication control rule, a specific implementation that the user equipment activates or deactivates the data replication based on the first MAC CE and the second MAC CE includes:

in a case where the first MAC CE activates the data replication and the second MAC CE activates the data replication, the user equipment activates the data replication;

in a case where the first MAC CE deactivates the data replication and the second MAC CE activates the data replication, the user equipment activates the data replication;

in a case where the first MAC CE activates the data replication and the second MAC CE deactivates the data replication, the user equipment activates the data replication;

in a case where the first MAC CE deactivates the data replication and the second MAC CE deactivates the data replication, the user equipment deactivates the data replication.

For example, it is assumed that the first MAC CE is Activation and the second MAC CE is Activation, the user equipment activates the data replication. It is further assumed that the first MAC CE is Deactivation and the second MAC CE is Activation, the user equipment activates the data replication. It is further assumed that the first MAC CE is Activation and the second MAC CE is Deactivation, the user equipment activates the data replication. It is further assumed that the first MAC CE is Deactivation and the second MAC CE is Deactivation, the user equipment deactivates the data replication.

In an embodiment of the present application, the method further includes:

in a case where the user equipment activates the data replication and the second MAC CE activates the data replication, the user equipment sends data on a path where the first network device is located and a path where the second network device is located.

Specifically, under the foregoing first data replication control rule, in the case where the first MAC CE activates the data replication and the second MAC CE activates the data replication, the user equipment activates the data replication. Under the second data replication control rule, in the case where the first MAC CE activates the data replication, and the second MAC CE activates the data replication; or, in the case where the first MAC CE deactivates the data replication, and the second MAC CE activates the data replication; or, in the case where the first MAC CE activates the data replication and the second MAC CE deactivates the data replication, the user equipment activates the data replication.

Based on the foregoing first data replication control rule, in an embodiment of the present application, the method further includes that:

in a case where the first MAC CE activates the data replication and the second MAC CE deactivates the data replication, the user equipment sends data on a path where the first network device is located.

Based on the foregoing first data replication control rule, in an embodiment of the present application, the method further includes that:

in a case where the first MAC CE deactivates the data replication and the second MAC CE activates the data replication, the user equipment sends data on a path where the second network device is located.

Based on the foregoing first data replication control rule, in an embodiment of the present application, the method further includes that:

in a case where the first MAC CE deactivates the data replication and the second MAC CE deactivates the data replication, the user equipment sends data on a default path.

Specifically, the network device sends the MAC CE for activating the data replication only if a state of the network device is good. If the MAC CE sent by the first network device to the user equipment is Activation, and the MAC CE sent by the second network device to the user equipment is Deactivation, then the user equipment deactivates the data replication based on the two MAC CEs. In order to ensure the stability of the data transmission, after deactivating the data replication, the user equipment sends the data to the path where the first network device is located.

For example, it is assumed that the first MAC CE is Activation and the second MAC CE is Activation, then in this case, the user equipment activates the data replication, and the user equipment sends data to the two paths. It is further assumed that the first MAC CE is Deactivation and the second MAC CE is Activation, then in this case, the user equipment deactivates the data replication, and since the second network device intends to activate, the user equipment sends data to the path where the second network device is located. It is further assumed that the first MAC CE is Activation and the second MAC CE is Deactivation, then in this case, the user equipment deactivates the data replication, and since the first network device intends to activate, the user equipment sends data to the path where the first network device is located. It is further assumed that the first MAC CE is Deactivation and the second MAC CE is Deactivation, then in this case, the user equipment deactivates the data replication, and since both the first network device and the second network device do not intend to activate, but the user equipment still needs to send data to the network device, then the user equipment sends data to the default path.

In an embodiment of the present application, a specific implementation that the user equipment sends the data on the path where the first network device is located includes that: the user equipment sends the data on the path where the first network device is located in a case where the data to be sent by the user equipment is less than or equal to a threshold.

In an embodiment of the present application, a specific implementation that the user equipment sends the data on the path where the second network device is located includes that: the user equipment sends the data on the path where the second network device is located in a case where the data to be sent by the user equipment is less than or equal to a threshold.

In an embodiment of the present application, a specific implementation that the user equipment sends the data on the default path includes that: the user equipment sends data on the default path in a case where the data to be sent by the user equipment is less than or equal to a threshold.

Furthermore, the method further includes:

the user equipment sends the data on the path where the first network device is located and the path where the second network device is located in a case where the data to be sent by the user equipment is greater than the threshold; where data sent on the path where the first network device is located is different from data sent on the path where the second network device is located.

Specifically, in the case where the data replication is deactivated and the data to be sent by the user equipment is less than or equal to the threshold, then at this time, since the user equipment needs to send less data, the data may be sent merely on one path. In the case where the data replication is deactivated and the data to be sent by the user equipment is greater than the threshold, then at this time, since the user equipment needs to send more data, the user equipment using merely one path to send the data may result in a problem of the data transmission efficiency being low, and in this case, in order to improve the data transmission efficiency, the user equipment sends the data through two paths. For example, the data to be sent by the user equipment includes data 1, data 2, data 3, data 4, data 5, and data 6, and the user equipment sends data 1, data 2, and data 3 on the path where the first network device is located, and sends data 4, data 5, and data 6 on the path where the second network device is located.

In an embodiment of the present application, a specific implementation that the first network device sends the default path configuration information to the second network device and the user equipment includes:

in a case where a data replication bearer is established, the first network device sends the default path configuration information to the second network device and the user equipment.

Specifically, in the case where the data replication bearer is first established, on the second network device and the user equipment side, they do not known which is the default path of the bearer established first, therefore, in this case, the first network device needs to send the default path configuration information to the second network device and the user equipment, and notify the second network device and the user equipment of a specific situation of the bearer in time.

In an embodiment of the present application, a specific implementation that the first network device sends the default path configuration information to the second network device and the user equipment includes:

in a case where a default path of an data replication bearer, that has been established, is modified, the first network device sends the default path configuration information to the second network device and the user equipment.

Specifically, in the case where the default path of the data replication bearer, that has been established, is modified, on the second network device and the user equipment side, they do not known which is the default path of the established bearer, therefore in this case, the first network device needs to send the default path configuration information to the second network device and the user equipment, and notify the second network device and the user equipment of the specific conditions established.

In an embodiment of the present application, the default path configuration information is used by the second network device to determine whether to reserve resources for a link where the user equipment is located; or, in a case where the second MAC CE deactivates the data replication, the default path configuration information is used by the second network device to determine whether to reserve resources for the link where the user equipment is located.

Specifically, it is assumed that the default path is not the path where the second network device is located, the second MAC CE sent by the second network device is Deactivation, and the second network device knows that it is impossible for the user equipment to send the data on the path where the second network device is located, then in this case, the second network device does not need to reserve resources for the link where the user equipment is located; 2) it is assumed that the default path is the path where the second network device is located, the second MAC CE sent by the second network device is Deactivation, and the second network device does not know whether the user equipment will send the data on the path where the second network device is located subsequently, then in order to avoid the problem of untimely data receiving and missed receiving, in this case, the second network device needs to reserve resources for the link where the user equipment is located. In addition, in the case where the second MAC CE sent by the second network device is Activation, regardless of whether the default path is the path where the second network device is located, the user equipment need to send the data on the path where the second network device is located subsequently, and in this case, the second network device needs to reserve resources for the link where the user equipment is located.

It should be noted that a time at which the first network device sends the default path configuration information to the second network device may be the same as a time at which the first network device sends the default path configuration information to the user equipment, or may be different, which is not limited herein. A time at which the first network device sends the first MAC CE to the user equipment may be the same as a time at which the second network device sends the second MAC CE to the user equipment, or may be different, which is not limited herein.

The above method is exemplified below based on the above explanation.

First example: it is assumed that under DC, the first network device is a MN and the second network device is a SN. First, the MN sends default path configuration information to the SN and the user equipment, and it is assumed that the default path configuration information is configuration information of a MCG, it may be known that the default path is the path where the first network device is located. The MN sends the first MAC CE to the user equipment, it is assumed that the first MAC CE is activation. The SN sends the second MAC CE to the user equipment, and it is assumed that the second MAC CE is Deactivation. Since the SN knows that the path where it is located is not the default path and knows that it sends Deactivation, and then knows it is impossible for the subsequent user equipment to send the data on the path, the SN does not need to reserve resources for the link where the user equipment is located. The user equipment knows that it is needed to deactivate the data replication based on the first MAC CE and the second MAC CE, and send the data on the path where the first network device is located subsequently.

Second example: It is assumed that under DC, the first network device is a MN and the second network device is a SN. First, the MN sends the default path configuration information to the SN and the user equipment, and it is assumed that the default path configuration information is configuration information of a SCG, it may be known that the default path is the path where the second network device is located. The MN sends the first MAC CE to the user equipment, it is assumed that the first MAC CE is Deactivation. The SN sends the second MAC CE to the user equipment, it is assumed that the second MAC CE is Deactivation. Since the SN knows that the path where it is located is the default path, even if the SN sends Deactivation, the SN does not know whether the user equipment will send the data on this path subsequently, then at this time, the SN needs to reserve resources for the link where the user equipment is located. The MN knows that the path that it is located is not the default path, and the MN knows that it is impossible for the user equipment to send the data on this path subsequently, then the MN does not need to reserve resources for the link where the user equipment is located. The user equipment knows that it is needed to deactivate the data replication based on the first MAC CE and the second MAC CE, and send the data on the SCG subsequently.

It should be noted that the above examples are for explanation merely and should not be construed as limiting.

It can be seen that, in a case where the MAC CEs sent by the two network devices are received, the user equipment may clarify whether the data replication is activated or deactivated based on the MAC CE-related data replication control rule configured in advance.

Figure 5:
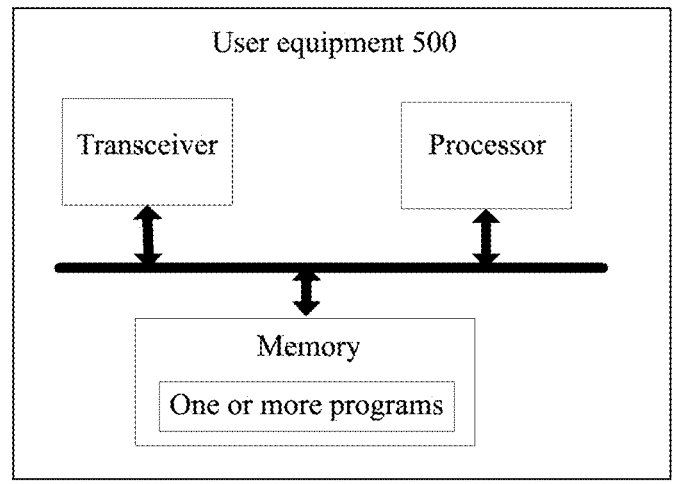
FIG. 5 is a schematic structural diagram of a user equipment provided in an embodiment of the present application.

Referring to FIG. 5, FIG. 5 is a user equipment 500 provided in an embodiment of the present application, which is applied to a communication system including a first network device, a second network device and a user equipment, the user equipment 500 including: one or more processors, one or more memories, one or more transceivers and one or more programs;

the one or more programs are stored in the memories and configured to be executed by the one or more processors;

the programs include instructions for executing the following steps:

receiving a first MAC CE sent by a first network device, and receiving a second MAC CE sent by a second network device; and activating or deactivating data replication based on the first MAC CE and the second MAC CE.

In some embodiments of the present application, in terms of activating or deactivating the data replication based on the first MAC CE and the second MAC CE, the programs include instructions specifically for executing the following steps:

in a case where the first MAC CE activates the data replication, and the second MAC CE activates the data replication, activating, by the user equipment, the data replication;

in a case where the first MAC CE deactivates the data replication, and the second MAC CE activates the data replication, deactivating, by the user equipment, the data replication;

in a case where the first MAC CE activates the data replication, and the second MAC CE deactivates the data replication, deactivating, by the user equipment, the data replication; and in a case where the first MAC CE deactivates the data replication, and the second MAC CE deactivates the data replication, deactivating, by the user equipment, the data replication.

In some embodiments of the present application, the programs include instructions that are also configured to execute the following steps:

in a case where the first MAC CE activates the data replication, and the second MAC CE activates the data replication, sending data on a path where the first network device is located and a path where the second network device is located.

In some embodiments of the present application, the programs include instructions that are also configured to execute the following steps:

in a case where the first MAC CE activates the data replication, and the second MAC CE deactivates the data replication, sending data on a path where the first network device is located.

In some embodiments of the present application, the programs include instructions that are also configured to execute the following steps:

in a case where the first MAC CE deactivates the data replication, and the second MAC CE activates the data replication, sending data on a path where the second network device is located.

In some embodiments of the present application, the programs include instructions that are also configured to execute the following steps:

receiving default path configuration information sent by the first network device; and in a case where the first MAC CE deactivates the data replication and the second MAC CE the deactivates data replication, sending data a default path.

In some embodiments of the present application, in terms of sending the data on the path where the first network device is located, the programs include instructions specifically for executing the following steps:

in a case where the data to be sent by the user equipment is less than or equal to a threshold, sending the data on the path where the first network device is located.

In some embodiments of the present application, in terms of sending data on default path where the second network device is located, the programs include instructions specifically for executing the following steps:

in a case where the data to be sent by the user equipment is less than or equal to a threshold, sending the data on the path where the second network device is located.

In some embodiments of the present application, in terms of sending the data on the default path, the programs include instructions specifically for executing the following steps:

in a case where the data to be sent by the user equipment is less than or equal to a threshold, sending the data on the default path.

In some embodiments of the present application, the program includes instructions that are also configured to execute the following steps:

in a case where the data to be sent by the user equipment is greater than the threshold, sending the data on the path where the first network device is located and the path where the second network device is located; where data sent on the path where the first network device is located is different from data sent on the path where the second network device is located.

It should be noted that the specific implementations of the contents described in the present embodiment may be referred to the foregoing method, and is not described herein.

Figure 6:
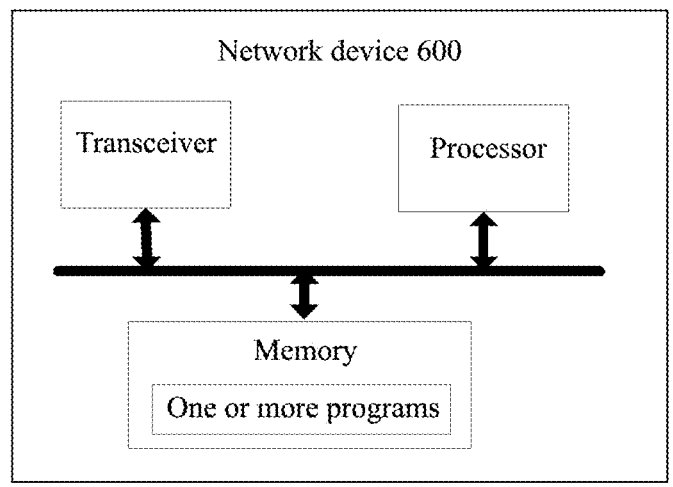
FIG. 6 is a schematic structural diagram of a network device provided in an embodiment of the present application.

Referring to FIG. 6, FIG. 6 is a network device 600 provided in an embodiment of the present application, which is applied to a communication system including a first network device, a second network device and a user equipment, where the network device 600 is the first network device, the network device 600 includes: one or more processors, one or more memories, one or more transceivers and one or more programs;

the one or more programs are stored in the memories and configured to be executed by the one or more processors;

the programs include instructions for executing the following steps:

sending default path configuration information to a second network device and a user equipment; and sending a first MAC CE to the user equipment, where the MAC CE is configured to activate or deactivate data replication.

In some embodiments of the present application, in terms of sending the default path configuration information to the second network device and the user equipment, the programs include instructions specifically for executing the following steps:

in a case where a data replication bearer is established, sending, the default path configuration information to the second network device and the user equipment.

In some embodiments of the present application, in terms of sending the default path configuration information to the second network device and the user equipment, the programs include instructions specifically for executing the following steps:

in a case where a default path of an data replication bearer, that has been established, is modified, sending, by a first network device, the default path configuration information to the second network device and the user equipment.

It should be noted that the specific implementations of the contents described in the present embodiment may be referred to the foregoing method, and is not described herein.

Figure 7:
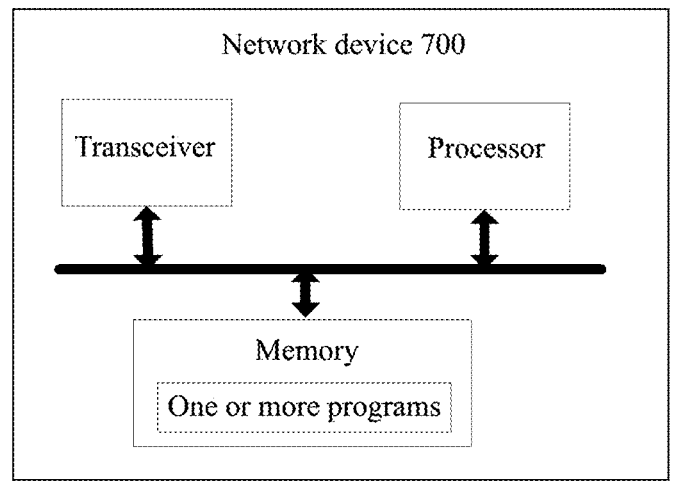
FIG. 7 is a schematic structural diagram of another network device provided in an embodiment of the present disclosure.

Referring to FIG. 7, FIG. 7 is a network device 700 provided in an embodiment of the present application, which is applied to a communication system including a first network device, a second network device and a user equipment, where the network device 700 is the second network device, the network device 700 includes: one or more processors, one or more memories, one or more transceivers and one or more programs;

the one or more programs are stored in the memories and configured to be executed by the one or more processors;

the programs include instructions for executing the following steps:

receiving default path configuration information sent by a first network device; and sending a second MAC CE to a user equipment, where the second MAC CE is configured to activate or deactivate data replication.

It should be noted that the specific implementations of the contents described in the present embodiment may be referred to the foregoing method, and is not described herein.

Figure 8:
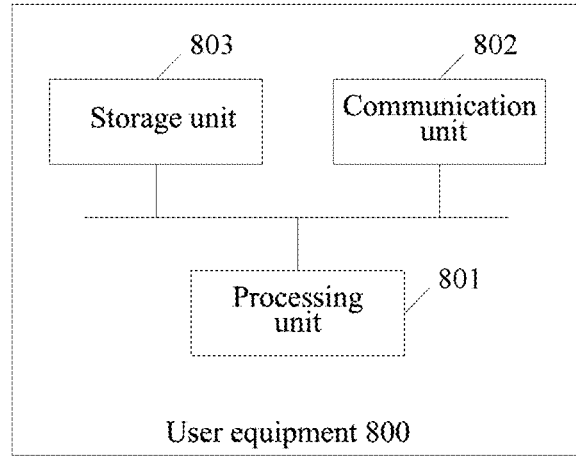
FIG. 8 is a schematic structural diagram of another user equipment provided in an embodiment of the present disclosure.

Referring to FIG. 8. FIG. 8 is a user equipment 800 provided in an embodiment of the present application, which is applied to a communication system including a first network device, a second network device and a user equipment, the user equipment 800 includes a processing unit 801, a communication unit 802 and a storage unit 803, where:

the processing unit 801 is configured to receive, through the communication unit 802, a first MAC CE sent by a first network device, and receive a second MAC CE sent by a second network device; and the processing unit 801 is further configured to activate or deactivate data replication based on the first MAC CE and the second MAC CE.

In some embodiments of the present application, in terms of activating or deactivating the data replication based on the first MAC CE and the second MAC CE, the processing unit 801 is specifically configured to:

activate the data replication in a case where the first MAC CE activates the data replication and the second MAC CE activates the data replication;

deactivate the data replication in a case where the first MAC CE deactivates the data replication and the second MAC CE activates the data replication;

deactivate the data replication in a case where the first MAC CE activates the data replication and the second MAC CE deactivates the data replication;

deactivate the data replication in a case where the first MAC CE deactivates the data replication and the second MAC CE deactivates the data replication.

In some embodiments of the present application, the processing unit 801 is further configured to send, through the communication unit 802, data on a path where the first network device is located and a path where the second network device is located in a case where the first MAC CE activates the data replication, and the second MAC CE activates the data replication.

In some embodiments of the present application, the processing unit 801 is further configured to send, through the communication unit 802, data on a path where the first network device is located in a case where the first MAC CE activates the data replication and the second MAC CE deactivates the data replication.

In some embodiments of the present application, the processing unit 801 is further configured to send, through the communication unit 802, data on a path where the second network device is located in a case where the first MAC CE deactivates the data replication and the second MAC CE activates the data replication.

In some embodiments of the present application, the processing unit 801 is further configured to receive, through the communication unit 802, default path configuration information sent by the first network device; and send, through the communication unit 802, data on a default path in a case where the first MAC CE deactivates the data replication and the second MAC CE deactivates the data replication.

In some embodiments of the present application, in terms of sending the data on the path where the first network device is located, the processing unit 801 is specifically configured to:

in a case where the data to be sent by the user equipment is less than or equal to a threshold, send the data on the path where the first network device is located.

In some embodiments of the present application, in terms of sending the data on the path where the second network device is located, the processing unit 801 is specifically configured to:

in a case where the data to be sent by the user equipment is less than or equal to a threshold, send the data on the path where the second network device is located.

In some embodiments of the present application, in terms of sending the data on the default path, the processing unit 801 is specifically configured to:

in a case where the data to be sent by the user equipment is less than or equal to a threshold, send the data on the default path.

In some embodiments of the present application, the processing unit 801 is further configured to send the data on the path where the first network device is located and the path where the second network device is located in a case where the data to be sent by the user equipment is greater than the threshold; where data sent on the path where the first network device is located is different from data sent on the path where the second network device is located.

The processing unit 801 may be a processor or a controller (for example, it may be a central processing unit (CPU), a general-purpose processor, a digital signal processor (DSP), and an application-specific integrated circuit (ASIC), a field programmable gate array (FPGA) or other programmable logic device, transistor logic devices, hardware components, or any combination thereof. It may implement or perform various exemplary logical blocks, modules and circuits described in connection with the contents disclosed in the present application. The processor may also be a combination for implementing computing functions, for example, including one or more microprocessor combinations, a combination of a DSP and a microprocessor, and the like). The communication unit 802 may be a transceiver, a transceiver circuit, a radio frequency chip, a communication interface, and the like, and the storage unit 803 may be a memory.

When the processing unit 801 is a processor, the communication unit 802 is a communication interface, and the storage unit 803 is a memory, the user equipment involved in the embodiments of the present application may be the user equipment shown in FIG. 5.

Figure 9:
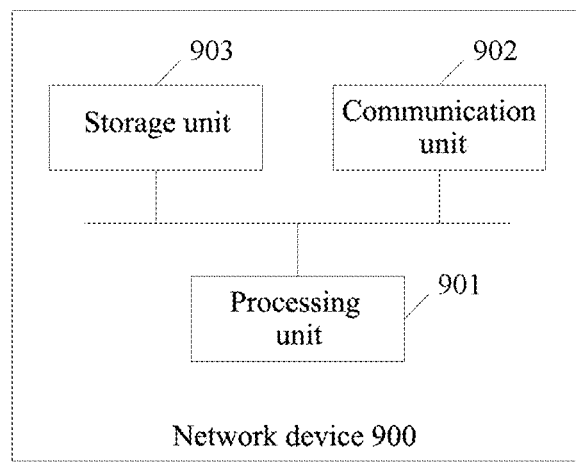
FIG. 9 is a schematic structural diagram of another network device provided in an embodiment of the present disclosure.

Referring to FIG. 9, FIG. 9 is a network device 900 provided in an embodiment of the present application, which is applied to a communication system including a first network device, a second network device and a user equipment, where the network device 900 is the first network device, and the network device 900 includes a processing unit 901, a communication unit 902 and a storage unit 903, where:

the processing unit 901 is configured to send, through the communication unit 902, default path configuration information to a second network device and a user equipment; and send, through the communication unit 902, a first MAC CE to the user equipment, where the MAC CE is configured to activate or deactivate data replication.

In some embodiments of the present application, in terms of sending the default path configuration information to the second network device and the user equipment, the processing unit 901 is specifically configured to:

send, through the communication unit 902, the default path configuration information to the second network device and the user equipment in a case where a data replication bearer is established.

In some embodiments of the present application, in terms of sending the default path configuration information to the second network device and the user equipment, the processing unit 901 is specifically configured to:

send, through the communication unit 902, the default path configuration information to the second network device and the user equipment in a case where a default path of an data replication bearer, that has been established, is modified.

The processing unit 901 may be a processor or a controller (for example, it may be a central processing unit (CPU), a general-purpose processor, a digital signal processor (DSP), and an application-specific integrated circuit (ASIC), a field programmable gate array (FPGA) or other programmable logic device, transistor logic devices, hardware components, or any combination thereof. It may implement or perform various exemplary logical blocks, modules and circuits described in connection with the contents disclosed in the present application. The processor may also be a combination for implementing computing functions, for example, including one or more microprocessor combinations, a combination of a DSP and a microprocessor, and the like). The communication unit 902 may be a transceiver, a transceiver circuit, a radio frequency chip, a communication interface, and the like, and the storage unit 903 may be a memory.

When the processing unit 901 is a processor, the communication unit 902 is a communication interface, and the storage unit 903 is a memory, the network device involved in the embodiments of the present application may be the network device shown in FIG. 6.

Figure 10:
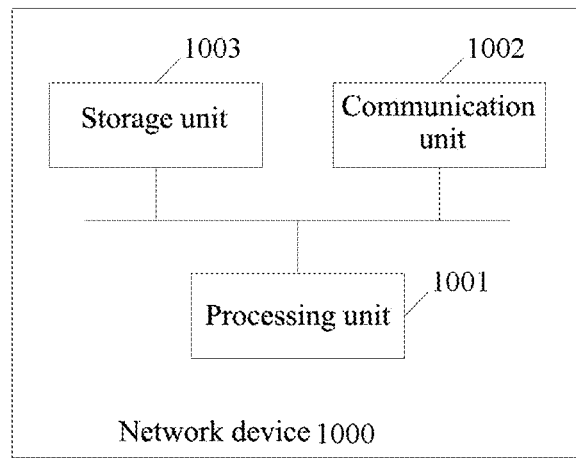
FIG. 10 is a schematic structural diagram of another network device provided in an embodiment of the present application.

Referring to FIG. 10, FIG. 10 is a network device 1000 provided in an embodiment of the present application, which is applied to a communication system including a first network device, a second network device and a user equipment, where the network device 1000 is the second network device, and the network device 1000 includes a processing unit 1001, a communication unit 1002 and a storage unit 1003, where:

the processing unit 1001 is configured to receive, through the communication unit 1002, default path configuration information sent by a first network device, and send, through the communication unit 1002, a second MAC CE to a user equipment, where the second MAC CE is configured to activate or deactivate data replication.

The processing unit 1001 may be a processor or a controller (for example, it may be a central processing unit (CPU), a general-purpose processor, a digital signal processor (DSP), and an application-specific integrated circuit (ASIC), a field programmable gate array (FPGA) or other programmable logic device, transistor logic devices, hardware components, or any combination thereof. It may implement or perform various exemplary logical blocks, modules and circuits described in connection with the contents disclosed in the present application. The processor may also be a combination for implementing computing functions, for example, including one or more microprocessor combinations, a combination of a DSP and a microprocessor, and the like). The communication unit 1002 may be a transceiver, a transceiver circuit, a radio frequency chip, a communication interface, and the like, and the storage unit 1003 may be a memory.

When the processing unit 1001 is a processor, the communication unit 1002 is a communication interface, and the storage unit 1003 is a memory, the network device involved in the embodiments of the present application may be the network device shown in FIG. 7.

An embodiment of the present application further provides a computer readable storage medium, where the computer readable storage medium stores a computer program for electronic data exchange, where the computer program causes a computer to execute part or all of the steps described by the first network device in the method embodiments described above.

An embodiment of the present application further provides a computer readable storage medium, where the computer readable storage medium stores a computer program for electronic data exchange, where the computer program causes a computer to execute part or all of the steps described by the user equipment in the method embodiment described above.

An embodiment of the present application further provides a computer readable storage medium, where the computer readable storage medium stores a computer program for electronic data exchange, where the computer program causes a computer to execute part or all of the steps described by the second network device in the method embodiments described above.

An embodiment of the present application further provides a computer program product, where the computer program product includes a non-transitory computer readable storage medium storing a computer program, and the computer program is operated to cause a computer to execute part or all of the steps described by the first network device in the method described above. The computer program product may be a software installation package.

An embodiment of the present application further provides a computer program product, where the computer program product includes a non-transitory computer readable storage medium storing a computer program, and the computer program is operated to cause a computer to execute part or all of the steps described by the user equipment in the method described above. The computer program product may be a software installation package.

An embodiment of the present application further provides a computer program product, where the computer program product includes a non-transitory computer readable storage medium storing a computer program, and the computer program is operated to cause a computer to execute part or all of the steps described by the second network device in the method described above. The computer program product may be a software installation package.

The steps of the method or algorithm described in the embodiments of the present application may be implemented in a hardware mode, or may be implemented by a processor executing software instructions. The software instructions may be composed of corresponding software modules which may be stored in a random access memory (RAM), a flash memory, a read only memory (ROM), an erasable programmable ROM (EPROM), an electrically EPROM (EEPROM), a register, a hard disk, a removable hard disk, a compact disk read only memory (CD-ROM) or any other form of storage medium known in the art. An exemplary storage medium is coupled to a processor to enable the processor to read information from, and write information to, the storage medium. Of course, the storage medium may also be an integral part of the processor. The processor and the storage medium may be located in an ASIC. Additionally, the ASIC may be located in an access network device, a target network device, or a core network device. Of course, the processor and the storage medium may also exist as discrete components in the access network device, the target network device, or the core network device.

Those skilled in the art should realize that in one or more of the above examples, the functions described in the embodiments of the present application may be implemented in whole or in part by a software, a hardware, a firmware, or any combination thereof. When implemented in software, it may be implemented in whole or in part in the form of a computer program product. The computer program product includes one or more computer instructions. When the computer program instructions are loaded and executed on a computer, the processes or functions described in accordance with the embodiments of the present application are generated in whole or in part. The computer may be a general purpose computer, a special purpose computer, a computer network, or other programmable apparatuses. The computer instructions may be stored in a computer readable storage medium or transferred from one computer readable storage medium to another computer readable storage medium. For example, the computer instructions may be transmitted through wire (e.g., a coaxial cable, a fiber optic, a digital subscriber line (DSL)) or wireless (e.g., infrared, wireless, microwave, or the like) from a website site, a computer, a server or a data center to another website site, computer, server, or data center. The computer readable storage medium may be any available media that may be accessed by the computer or a data storage device such as a server, a data center, and the like, that includes one or more available media integration. The available medium may be a magnetic medium (for example, a floppy disk, a hard disk, a magnetic tape), an optical medium (for example, a digital video disc (DVD)), or a semiconductor medium (for example, a solid state disk (SSD)) and the like.

The specific implementations described above further explain the purposes, technical solutions, and beneficial effects of the embodiments of the present application, and it should be understood that the foregoing description is merely the specific implementations of the embodiments of the present application, and are not configured to limit the protection scope of the present application, and any modifications, equivalent substitutions, improvements, and the like based on the technical solutions of the embodiments of the present application should all be included in the protection scope of the embodiments of the present application.

What is claimed is:

1. A data replication controlling method, comprising:
receiving, by a user equipment, a first media access control (MAC) control element (CE) sent by a first network device, and receiving a second MAC CE sent by a second network device; and
activating or deactivating, by the user equipment, data replication based on the first MAC CE and the second MAC CE;
wherein in a first alternative, the activating or deactivating, by the user equipment, data replication based on the first MAC CE and the second MAC CE, comprises:
in a case where the first MAC CE activates the data replication, and the second MAC CE activates the data replication, activating, by the user equipment, the data replication; in a case where the first MAC CE deactivates the data replication, and the second MAC CE activates the data replication, deactivating, by the user equipment, the data replication; in a case where the first MAC CE activates the data replication, and the second MAC CE deactivates the data replication, deactivating, by the user equipment, the data replication; and in a case where the first MAC CE deactivates the data replication, and the second MAC CE deactivates the data replication, deactivating, by the user equipment, the data replication;
in a second alternative, the activating or deactivating, by the user equipment, data replication based on the first MAC CE and the second MAC CE, comprises:
in a case where the first MAC CE activates the data replication, and the second MAC CE activates the data replication, activating, by the user equipment, the data replication; in a case where the first MAC CE deactivates the data replication, and the second MAC CE activates the data replication, activating, by the user equipment, the data replication; in a case where the first MAC CE activates the data replication, and the second MAC CE deactivates the data replication, activating, by the user equipment, the data replication; and in a case where the first MAC CE deactivates the data replication, and the second MAC CE deactivates the data replication, deactivating, by the user equipment, the data replication.

2. The method of claim 1, further comprising:
in a case where the user equipment activates the data replication, sending, by the user equipment, data on a path where the first network device is located and a path where the second network device is located.

3. The method of claim 1, further comprising:
in a case where the first MAC CE activates the data replication, and the second MAC CE deactivates the data replication, sending, by the user equipment, data on a path where the first network device is located.

4. The method of claim 1, further comprising:
in a case where the first MAC CE deactivates the data replication, and the second MAC CE activates the data replication, sending, by the user equipment, data on a path where the second network device is located.

5. The method of claim 1, further comprising:
receiving, by the user equipment, default path configuration information sent by the first network device; and in a case where the first MAC CE deactivates the data replication, and the second MAC CE deactivates the data replication, sending, by the user equipment, data on a default path.

6. A user equipment, comprising a transceiver, a memory, a processor, and a computer program stored on the memory and operable on the processor,
wherein the processor, when running the computer program, is configured to:
control the transceiver to receive a first media access control (MAC) control element (CE) sent by a first network device, and receive a second MAC CE sent by a second network device; and
activate or deactivate data replication based on the first MAC CE and the second MAC CE;
wherein in a first alternative, the processor is further configured to:
in a case where the first MAC CE activates the data replication, and the second MAC CE activates the data replication, activate the data replication; in a case where the first MAC CE deactivates the data replication, and the second MAC CE activates the data replication, deactivate the data replication; in a case where the first MAC CE activates the data replication, and the second MAC CE deactivates the data replication, deactivate the data replication; and in a case where the first MAC CE deactivates the data replication, and the second MAC CE deactivates the data replication, deactivate the data replication;
in a second alternative, the processor is further configured to:
in a case where the first MAC CE activates the data replication, and the second MAC CE activates the data replication, activate the data replication; in a case where the first MAC CE deactivates the data replication, and the second MAC CE activates the data replication, activate the data replication; in a case where the first MAC CE activates the data replication, and the second MAC CE deactivates the data replication, activate the data replication; and in a case where the first MAC CE deactivates the data replication, and the second MAC CE deactivates the data replication, deactivate the data replication.

7. The user equipment of claim 6, wherein the processor is further configured to:
in a case where the user equipment activates the data replication, control the transceiver to send data on a path where the first network device is located and a path where the second network device is located.

8. The user equipment of claim 6, wherein the processor is further configured to:
in a case where the first MAC CE activates the data replication, and the second MAC CE deactivates the data replication, control the transceiver to send data on a path where the first network device is located.

9. The user equipment of claim 6, wherein the processor is further configured to:
in a case where the first MAC CE deactivates the data replication, and the second MAC CE activates the data replication, control the transceiver to send data on a path where the second network device is located.

10. The user equipment of claim 6, wherein the processor is further configured to:
control the transceiver to receive default path configuration information sent by the first network device; and
in a case where the first MAC CE deactivates the data replication, and the second MAC CE deactivates the data replication, control the transceiver to send data on a default path.

11. The user equipment of claim 8, wherein the processor is further configured to:
in a case where the data to be sent by the user equipment is less than or equal to a threshold, control the transceiver to send the data on the path where the first network device is located.

12. The user equipment of claim 9, wherein the processor is further configured to:
in a case where the data to be sent by the user equipment is less than or equal to a threshold, control the transceiver to send the data on the path where the second network device is located.

13. The user equipment of claim 10, wherein the processor is further configured to:
in a case where the data to be sent by the user equipment is less than or equal to a threshold, control the transceiver to send the data on the default path.

14. The user equipment of claim 11, wherein the processor is further configured to:
in a case where the data to be sent by the user equipment is greater than the threshold, control the transceiver to send the data on the path where the first network device is located and the path where the second network device is located; wherein data sent on the path where the first network device is located is different from data sent on the path where the second network device is located.

15. A network device, applied to a communication system comprising a first network device, a second network device, and a user equipment, wherein the network device is the first network device, and the first network device comprises a transceiver, a memory, a processor, and a computer program stored on the memory and operable on the processor,
wherein the processor, when running the computer program, is configured to:
control the transceiver to send default path configuration information to the second network device and the user equipment; and
control the transceiver to send a first medium access control (MAC) control element (CE) to the user equipment, wherein the first MAC CE is configured to activate or deactivate data replication;
wherein in a first alternative, in a case where the first MAC CE activates the data replication, and a second MAC CE, which is received by the user equipment from the second network device, activates the data replication, the data replication is activated by the user equipment; in a case where the first MAC CE deactivates the data replication, and the second MAC CE activates the data replication, the data replication is deactivated by the user equipment; in a case where the first MAC CE activates the data replication, and the second MAC CE deactivates the data replication, the data replication is deactivated by the user equipment; and in a case where the first MAC CE deactivates the data replication, and the second MAC CE deactivates the data replication, the data replication is deactivated by the user equipment; or
in a second alternative, in a case where the first MAC CE activates the data replication, and a second MAC CE, which is received by the user equipment from the second network device, activates the data replication, the data replication is activated by the user equipment;

in a case where the first MAC CE deactivates the data replication, and the second MAC CE activates the data replication, the data replication is activated by the user equipment; in a case where the first MAC CE activates the data replication, and the second MAC CE deactivates the data replication, the data replication is activated by the user equipment; and in a case where the first MAC CE deactivates the data replication, and the second MAC CE deactivates the data replication, the data replication is deactivated by the user equipment.

16. The network device of claim 15, wherein the processor is further configured to:
 in a case where a data replication bearer is established, control the transceiver to send the default path configuration information to the second network device and the user equipment; or
 in a case where a default path of an data replication bearer, that has been established, is modified, control the transceiver to send the default path configuration information to the second network device and the user equipment.

\* \* \* \* \*